(12) United States Patent
Umino et al.

(10) Patent No.: US 9,376,071 B2
(45) Date of Patent: Jun. 28, 2016

(54) VEHICLE DATA SETTING SYSTEM AND OUTPUT SETTING METHOD THEREOF

(71) Applicant: YAZAKI CORPORATION, Minato-ku, Tokyo (JP)

(72) Inventors: Youichi Umino, Hiratsuka (JP); Yukio Kamiya, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/222,735

(22) Filed: Mar. 24, 2014

(65) Prior Publication Data

US 2014/0236422 A1   Aug. 21, 2014

Related U.S. Application Data

(63) Continuation of application No. PCT/JP2012/006202, filed on Sep. 27, 2012.

(30) Foreign Application Priority Data

Sep. 28, 2011   (JP) .................................. 2011-212431

(51) Int. Cl.
| | |
|---|---|
| *G01M 17/00* | (2006.01) |
| *G06F 7/00* | (2006.01) |
| *G06F 19/00* | (2011.01) |
| *B60R 16/023* | (2006.01) |

(52) U.S. Cl.
CPC ......... *B60R 16/0234* (2013.01); *B60R 16/0232* (2013.01)

(58) Field of Classification Search
USPC ............... 701/29, 33, 48, 36, 29.1, 32.7, 32.8, 701/33.1, 33.4, 33.7, 33.9; 702/183, 182; 340/286.01, 506, 438; 137/255; 123/575, 576

See application file for complete search history.

(56) References Cited

U.S. PATENT DOCUMENTS

| | | | | |
|---|---|---|---|---|
| 5,555,873 | A * | 9/1996 | Nolen ........................... | 123/575 |
| 5,608,271 | A | 3/1997 | Saka et al. | |
| 6,075,438 | A * | 6/2000 | Abe et al. ................. | 340/286.01 |
| 6,175,795 | B1 | 1/2001 | Sumida | |
| 6,405,744 | B1 * | 6/2002 | LaPant ............................. | 137/1 |
| 6,577,934 | B2 * | 6/2003 | Matsunaga et al. .......... | 701/32.7 |
| 7,209,860 | B2 * | 4/2007 | Trsar et al. .................... | 702/183 |

(Continued)

FOREIGN PATENT DOCUMENTS

| | | |
|---|---|---|
| CN | 101312277 A | 11/2008 |
| DE | 3913266 A1 | 10/1990 |

(Continued)

OTHER PUBLICATIONS

Japanese office action letter issued on Dec. 2, 2014 in the counterpart Japanese patent application.

(Continued)

*Primary Examiner* — Ronnie Mancho
(74) *Attorney, Agent, or Firm* — MOTS Law, PLLC

(57) ABSTRACT

A vehicle data setting system is provided with auxiliary connection terminals as standard equipment in addition to connection terminals normally used. When an output setting instruction is inputted to the vehicle data setting system from a failure diagnosis tool, output data to be outputted from the connection terminals are changed to desired data by control of a CPU.

12 Claims, 2 Drawing Sheets

(56) References Cited

U.S. PATENT DOCUMENTS

| | | | |
|---|---|---|---|
| 9,020,616 B2* | 4/2015 | Kishita et al. | 700/25 |
| 2003/0093199 A1* | 5/2003 | Mavreas | 701/33 |
| 2003/0158635 A1* | 8/2003 | Pillar | A62C 27/00 701/1 |
| 2003/0182485 A1* | 9/2003 | Schmeisser | 710/301 |
| 2004/0002794 A1* | 1/2004 | Pillar | A62C 27/00 701/1 |
| 2005/0177288 A1* | 8/2005 | Sullivan et al. | 701/36 |
| 2006/0190149 A1* | 8/2006 | LaPant | B60K 15/06 702/182 |
| 2007/0049086 A1 | 3/2007 | Sakane | |
| 2012/0030512 A1* | 2/2012 | Wadhwa et al. | 714/23 |

FOREIGN PATENT DOCUMENTS

| | | |
|---|---|---|
| DE | 10060981 A1 | 7/2002 |
| EP | 0699562 A2 | 3/1996 |
| EP | 0890485 A2 | 1/1999 |
| FR | 2859683 A1 | 3/2005 |
| JP | H09-16202 A | 1/1997 |
| JP | H09-117037 A | 5/1997 |
| JP | 2006-213145 A | 8/2006 |
| JP | 2007-253742 A | 10/2007 |
| JP | 2011-093374 A | 5/2011 |

OTHER PUBLICATIONS

Chinese office action letter issued on Aug. 4, 2015 in the counterpart Chinese patent application.

\* cited by examiner

VEHICLE DATA SETTING SYSTEM AND OUTPUT SETTING METHOD THEREOF

CROSS REFERENCE TO RELATED APPLICATIONS

This application is a continuation application of International Application No. PCT/JP2012/006202, filed on Sep. 27, 2012, which claims priority to Japanese Patent Application No. 2011-212431, filed on Sep. 28, 2011, the entire contents of which are incorporated by references herein.

BACKGROUND OF THE INVENTION

1. Field of the Invention

The present invention relates to a vehicle data setting system which acquires various types of data concerning a vehicle and outputs the acquired data to another on-vehicle device and to an output setting method thereof, and specifically relates to a technique to arbitrarily set data outputted from a connecting terminal exclusively used in a specially-equipped vehicle.

2. Description of the Related Art

A vehicle data setting system used for electric wiring of a vehicle includes a controller and a plurality of connectors. The vehicle data setting system acquires various types of data concerning the vehicle and outputs the acquired data to other on-vehicle devices connected through the connectors. For example, the vehicle data setting system acquires vehicle speed data, shift position data, and light on/off data and outputs these data to other on-vehicle devices through the connectors and wire harnesses.

In such a vehicle data setting system, the chassis is designed depending on the vehicle type and grade, thus the number of connectors therein is predetermined. Therefore, if it is necessary to add signal wiring used for vehicle data due to the case of changing in design from such a vehicle to a specially-equipped vehicle such as an ambulance, a welfare vehicle, or a cash transport vehicle, rewiring work and the like are required. For example, consider the case of changing in design from a typical van to an ambulance, which needs the capability to send control signals of a siren, a beacon light, and the like. In order to add such signal wiring, it is necessary to perform a work to add electric wiring to the standard product and the like.

Moreover, as a technique to add circuit parts depending on the vehicle type or grade, the technique described in Japanese Patent Application Laid-Open Publication No. 09-117037 (PTL 1) is known. In PTL 1, circuit parts and output terminals are added by properly stacking and adding wiring boards. Accordingly, the output terminals can be changed by easy operation.

However, the technique disclosed in PTL 1 requires the work of attaching a board and the like to add the circuit parts. The technique of PTL 1 therefore takes a lot of labor for attachment and as well as increases the cost by the attachment work.

SUMMARY OF THE INVENTION

As described above, in the conventional vehicle data setting system, when there is a need to change wiring in the case of changing specifications from a vehicle to a specially-equipped vehicle, it is necessary to add a new board. This requires complicated work and increases the cost.

The present invention has been made to solve such conventional problems, and an object of the present invention is to provide a vehicle data setting system capable of easily changing output signals of a specially-equipped vehicle and to provide an output setting method of the vehicle data setting system.

An aspect of the present invention is a vehicle data setting system. The vehicle data setting system includes: a standard connection terminal for electric connection to other on-vehicle device, and at least one auxiliary connection terminal; an input unit configured to receive an input of an output setting instruction to set data which is to be outputted from the auxiliary connection terminal; and a controller configured to perform control of outputting desired data to the standard connection terminal and outputting data corresponding to the output setting instruction inputted by the input unit to the auxiliary connection terminal.

In the vehicle data setting system and output setting method according to the present invention, in addition to the standard connection terminals, auxiliary connection terminals are provided as standard equipment. The output data is set according to the output setting instruction by the controller by inputting the output setting instruction by the input unit. It is therefore possible to set output data for a specially-equipped vehicle with extremely easy operation.

DESCRIPTION OF THE PREFERRED EMBODIMENTS

Figure 1:
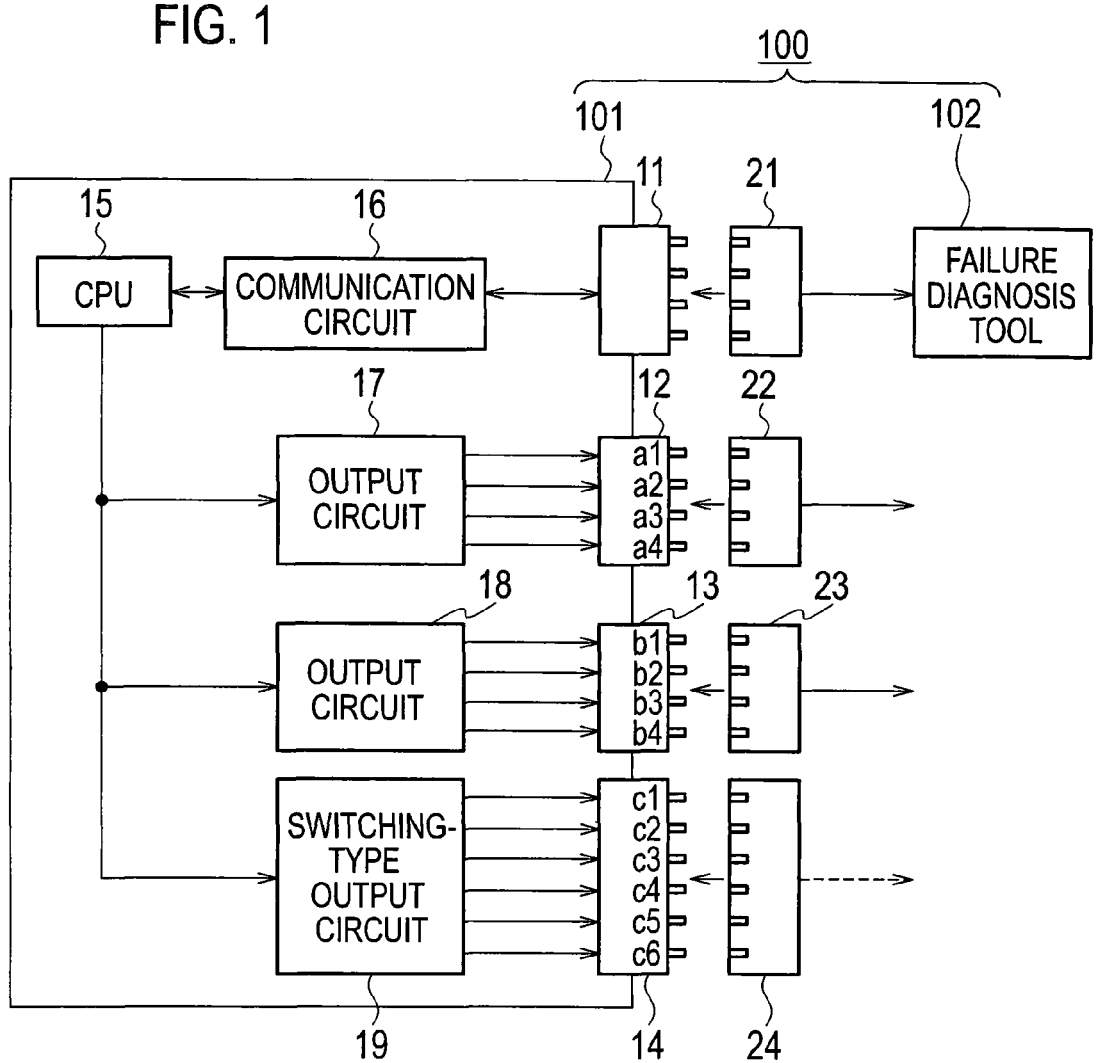
FIG. 1 is a block diagram showing a configuration of a vehicle data setting system according to an embodiment of the present invention.

Hereinafter, a description is given of an embodiment of the present invention based on the drawings. FIG. 1 is a block diagram of a vehicle data setting system 100 according to the embodiment of the present invention. The vehicle data setting system 100 includes a control unit 101 and a failure diagnosis tool 102. The failure diagnosis tool 102 is connected to the control unit 101, and diagnoses operations of various on-vehicle devices.

Figure 2:
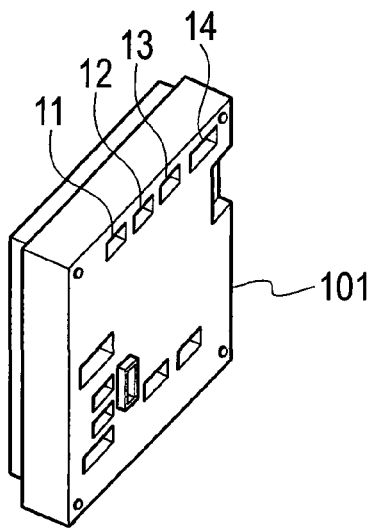
FIG. 2 is an exterior view showing a configuration of a control unit in the vehicle data setting system according to the embodiment of the present invention.

The control unit 101 has a configuration as shown in FIG. 2 as a whole. The control unit 101 has functions to acquire output signals from the various electric components, sensors, and the like which are mounted on a vehicle and to send data based on the acquired output signals to other electric components or other control units. The control unit 101 includes: a CPU (controller) 15 configured to perform comprehensive control; a diagnosis connector 11 for connecting the failure diagnosis tool 102; standard connectors 12 and 13; and a specially-equipped vehicle connector (auxiliary connector) 14.

The diagnosis connector 11 is used to connect the aforementioned failure diagnosis tool 102. The diagnosis connector 11 is detachably attached to an external connector 21, which is connected to the failure diagnosis tool 102 through an in-vehicle communication network (CAN (controller area network) communication or the like). Moreover, the diagnosis connector 11 is connected to the CPU 15 through a communication circuit 16. When a diagnosis signal from the failure diagnosis tool 102 is inputted to the diagnosis connector 11, a diagnosis process is executed by control of the CPU 15. Specifically, when receiving a pseudo signal representing operation of each on-vehicle device from the failure diagnosis tool 102, the CPU 15 sends to the on-vehicle device a control instruction corresponding to the received diagnosis signal and determines whether the on-vehicle device is normally operating. The CPU 15 outputs the determination result to the failure diagnosis tool 102.

Moreover, the failure diagnosis tool 102 includes a function to receive an output setting instruction to set output data of each connection terminal (described in detail later) provided in the specially-equipped vehicle connector 14. In other words, the failure diagnosis tool 102 includes a function as an input unit which is configured to receive an input of the output setting instruction to set data outputted from each connection terminal provided for the specially-equipped vehicle connector 14.

The standard connectors 12 and 13 are normally included in the vehicle which is provided with the vehicle data setting system 100. The standard connectors 12 and 13 include a plurality of connection terminals (standard connection terminals). In this example, four terminals a1 to a4 and b1 to b4 are provided for each connector. The standard connectors 12 and 13 can be detachably attached to external connectors 22 and 23, respectively, and are electrically connected to connection terminals provided in the external connectors 22 and 23 to output various data to external devices.

The standard connector 12 is connected to an output circuit 17, and the standard connector 13 is connected to an output circuit 18. The output circuits 17 and 18 are connected to the CPU 15. The output circuits 17 and 18 output desired data to the connection terminals a1 to a4 and b1 to b4 by control of the CPU 15. For example, lighting data of headlights is outputted from the connection terminal a1, and operation data of an air conditioner is outputted from the connection terminal a2. In such a manner, data can be sent to other on-vehicle devices through the external connectors 22 and 23, which are respectively connected to the standard connectors 12 and 13.

The specially-equipped vehicle connector 14 is not in use in normal vehicles. When changing in specifications from the vehicle to a specially-equipped vehicle such as an ambulance, the specially-equipped vehicle connector 14 is used as a connector to output data to the outside, wherein the data is added due to the change in specifications.

The specially-equipped vehicle connector 14 includes a plurality of connection terminals (auxiliary connection terminals). In this example, six connection terminals c1 to c6 are provided. The specially-equipped vehicle connector 14 can be detachably attached to an external connector 24 provided for a specially-equipped vehicle. The specially-equipped vehicle connector 14 is further connected to a switching-type output circuit 19.

The switching-type output circuit 19 is a circuit to output data which is to be outputted from the respective connection terminals c1 to c6, which are provided for the specially-equipped vehicle connector 14. The data to be outputted can be properly set by control of the CPU 15. For example, in the case of changing specifications from a vehicle to an ambulance, the data to be outputted can be set to lighting data of a beacon light mounted on the ambulance, output data of siren, and the like.

Figure 3:
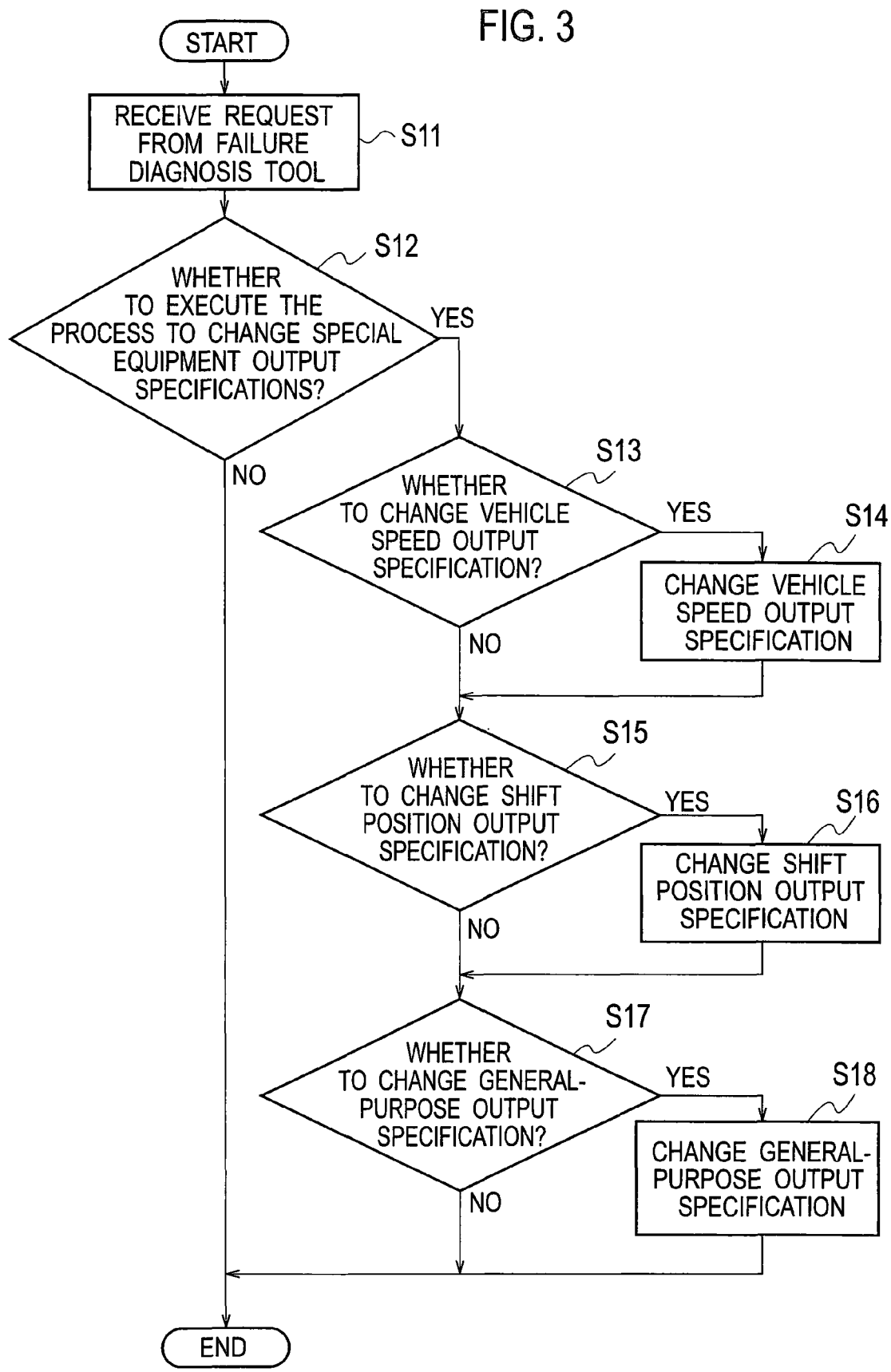
FIG. 3 is a flowchart showing a procedure to set output data of a specially-equipped vehicle connector by the vehicle data setting system according to the embodiment of the present invention.

Next, a description is given of an operation of the vehicle data setting system according to the embodiment configured as described above. FIG. 3 is a flowchart showing a procedure of a process to change the output data by the CPU 15. Hereinafter, with reference to FIG. 3, a description is given of the procedure of the process to change data to be outputted from the respective connection terminals c1 to c6 of the specially-equipped vehicle connector 14.

To change output signals of the switching-type output circuit 19, first, the external connector 21, which is connected to the failure diagnosis tool 102, is connected to the diagnosis connector 11, and the failure diagnosis tool 102 inputs an output setting signal to the diagnosis connector 11. In step S11 shown in FIG. 3, the CPU 15 receives the output setting signal through the communication circuit 16.

In step S12, the CPU 15 determines whether to execute the process to change the specifications of output data for the special equipment vehicle. Specifically, the CPU 15 determines whether to perform the process to change the output data outputted from the switching-type output circuit 19, that is, the output data to be outputted from the connection terminals c1 to c6. If it is unnecessary to change the output data, for example, if the output data required by the output setting signal is identical to output data already set (NO in the step S12), the process is terminated. On the other hand, if the process to change the output data is executed (YES in the step S12), the process goes to step S13.

In the step S13, the CPU 15 determines whether the command to change the output specification of vehicle speed output data is inputted. If the command to change the specification of vehicle speed output data is inputted, the specification of the vehicle output data are changed in step S14.

In step S15, the CPU 15 determines whether a command to change the output specification of shift position data is inputted. If the command to change the specification of the shift position data is inputted, the specification of the shift position data is changed in step S16.

In step S17, the CPU 15 determines whether a command to change the output specifications of other general-purpose output data (for example, lighting data of the beacon light and the like) is inputted. If the command to change the output specifications of the general-purpose output data is inputted, the specifications of the general-purpose output data are changed in step S18. When the setting or change of the output data concerning all the connection terminals c1 to c6 is finished, this process is terminated.

In such a manner, the output data to be outputted from the switching-type output circuit 19 is appropriately changed by inputting the setting instruction signal from the failure diagnosis tool 102.

As described above, the vehicle data setting system 100 according to the embodiment is normally provided with the connection terminals c1 to c6 (auxiliary connection terminals) in addition to the connection terminals a1 to a4 and b1 to b4 (standard connection terminals). When the output setting instruction is inputted from the failure diagnosis tool 102 (input unit), the output data is set based on the output setting instruction by the CPU 15 (controller). Accordingly, it is possible to set the output data for a specially-equipped vehicle by extremely easy operation.

In the case of changing in specifications from a vehicle to a specially-equipped vehicle, therefore, addition of new output data does not require a work to change existing signal wiring or add a new wiring board. It is therefore possible to change the specifications by extremely easy operation so that output data used in the specially-equipped vehicle is outputted. Furthermore, the output data can be changed with the control unit 101 being mounted on the vehicle, thus eliminating the complicated works including detaching the control unit 101.

Moreover, the connection terminals c1 to c6 are provided within the single specially-equipped vehicle connector 14.

Accordingly, the connection terminals c1 to c6 can be easily connected to external terminals by connecting the specially-equipped vehicle connector 14 to the external connector 24.

Furthermore, if the input unit is mounted on a diagnosis terminal device, the input unit can be used as a terminal device used in diagnosis by the control unit 101. Accordingly, it is unnecessary to separately prepare a terminal device for inputting, thus simplifying the system configuration.

In the aforementioned embodiment, the single specially-equipped vehicle connector 14 includes the connection terminals c1 to c6. However, the present invention is not limited such a configuration, and two or more connectors may be provided for a specially-equipped vehicle. Moreover, such a connector for a specially-equipped vehicle may be shared with another connector. Specifically, it may be configured so that the standard connection terminals and connection terminals for a specially-equipped vehicle are provided within the same connector.

Moreover, the number of connection terminals provided for the specially-equipped vehicle connector 14 is not limited to six and can be variously changed.

Furthermore, in the example described in the embodiment, the terminal device for changing the output data of the specially-equipped vehicle connection terminals c1 to c6 is the failure diagnosis tool 102. However, the present invention is not limited to such a configuration, and a terminal device dedicated for outputting an instruction signal to change output data may be connected. Moreover, in the example described in the embodiment, the terminal device (failure diagnosis tool 102) is connected through the connector (diagnosis connector 11) to input the instruction signal to the CPU 15. However, the present invention is not limited to such a configuration, and the control unit 101 may include an input unit for changing the settings.

Hereinabove, the vehicle data setting system and the method of setting the output of the vehicle data setting system of the present invention are described based on the embodiment shown in the drawings. The present invention is not limited to this, and the configuration of each part can be replaced with an arbitrary configuration having a similar function.

What is claimed is:

1. A vehicle data setting system, which is mounted on a vehicle, and which is configured to acquire data concerning the vehicle and to output the acquired data to another on-vehicle device, the system comprising:
   a standard connection terminal for electric connection to the other on-vehicle device;
   at least one auxiliary connection terminal;
   an input unit that receives an input of an output setting instruction to set data which is to be outputted from the auxiliary connection terminal; and
   a controller that controls outputting of desired data to the standard connection terminal and outputting data corresponding to the output setting instruction inputted by the input unit to the auxiliary connection terminal,
   wherein the controller determines whether to change a specification of the output data for the vehicle based on determining whether the output data corresponding to the setting instruction is identical to output data already set.

2. The vehicle data setting system according to claim 1, wherein the auxiliary connection terminal is provided in one auxiliary connector and is connected to another on-vehicle device through the auxiliary connector.

3. The vehicle data setting system according to claim 1, further comprising:
   a diagnosis terminal device for diagnosis of each on-vehicle device connected to the standard connection terminal; and
   a diagnosis connector configured to be connected to the diagnosis terminal device, wherein
   the input unit is mounted on the diagnosis terminal device.

4. The vehicle data setting system according to claim 2, further comprising:
   a diagnosis terminal device for diagnosis of each on-vehicle device connected to the standard connection terminal; and
   a diagnosis connector configured to be connected to the diagnosis terminal, wherein
   the input unit is mounted on the diagnosis terminal device.

5. A method for setting output data of a vehicle data setting system, which is mounted on a vehicle and which is configured to acquire various data concerning the vehicle and to output the acquired data to another on-vehicle device, the method comprising:
   receiving an input of a setting instruction to set data which is to be outputted from at least one auxiliary connection terminal which is provided to output data used in a specially-equipped vehicle;
   setting data outputted from the auxiliary connection terminal based on the setting instruction; and
   determining whether to change a specification of output data for the specially-equipped vehicle by determining whether the output data required by the setting instruction is identical to output data already set.

6. The vehicle data setting system according to claim 1, further comprising:
   a plurality of auxiliary connection terminals; and
   a switching-type output circuit coupled to the controller, the switching-type output circuit configured to output the data corresponding to the output setting instruction inputted by the input unit to the plurality of auxiliary connection terminals.

7. The vehicle data setting system according to claim 6, wherein the output setting instruction corresponds to an instruction for changing a specification of the vehicle to a specially-equipped vehicle.

8. The method for setting output data of a vehicle data setting system according to claim 5, wherein determining whether to change the specification of output data comprises determining whether the input of the setting instruction has been received.

9. The method for setting output data of a vehicle data setting system according to claim 5, wherein the set data comprises vehicle speed output data.

10. The method for setting output data of a vehicle data setting system according to claim 5, wherein the set data comprises vehicle shift position data.

11. The method for setting output data of a vehicle data setting system according to claim 5, wherein the set data comprises general purpose output data.

12. The method for setting output data of a vehicle data setting system according to claim 11, wherein the general purpose output data comprises lighting data of an ambulance beacon light.

* * * * *